United States Patent [19]

Ward

[11] 4,383,397
[45] May 17, 1983

[54] FURNITURE OR THE LIKE

[75] Inventor: Donald L. Ward, Leigh-on-Sea, England

[73] Assignee: White Seal Design (Finance) Limited, St. Helier, Channel Islands

[21] Appl. No.: 156,093

[22] Filed: Jun. 3, 1980

[30] Foreign Application Priority Data

Jun. 4, 1979 [GB] United Kingdom ................ 7919428

[51] Int. Cl.³ .............................................. E04B 1/00
[52] U.S. Cl. ...................................... 52/254; 403/231; 403/406; 403/188; 52/281; 52/282; 52/285
[58] Field of Search ............... 403/231, 187, 188, 405, 403/406; 217/40, 32, 30, 31, 65; 52/254, 281, 282, 285, 288

[56] References Cited

U.S. PATENT DOCUMENTS

| | | | |
|---|---|---|---|
| 622,118 | 3/1899 | Chase | 217/65 UX |
| 691,049 | 1/1902 | D'Espine | 217/65 UX |
| 1,836,221 | 12/1931 | Bohn | 217/65 UX |
| 1,936,733 | 11/1933 | Richardson | 217/65 UX |
| 3,102,615 | 9/1963 | Tuttle | 217/65 UX |
| 4,032,241 | 6/1977 | Martin . | |
| 4,142,342 | 3/1979 | Jungers et al. . | |

Primary Examiner—Wayne L. Shedd
Attorney, Agent, or Firm—Spencer & Kaye

[57] ABSTRACT

A method forming, in a simple manner, corner joints or the like in structures, such as articles of furniture incorporating panels of chipboard. A typical corner joint is formed using a connecting member in the form of a length cut from an extrusion of constant cruciform cross-section. Adjacent edges of two panels defining the corner are secured in respective diagonally opposite channels of four V-section channels defined by the extrusion, one of the two remaining channels which faces outwardly from the corner being occupied by a filling member. The longitudinally extending edge faces of the two webs of the cruciform cross-section which extend outwardly may be flush with the adjoining outer surfaces of the panels and the filling member to present the appearance of inlays.

3 Claims, 29 Drawing Figures

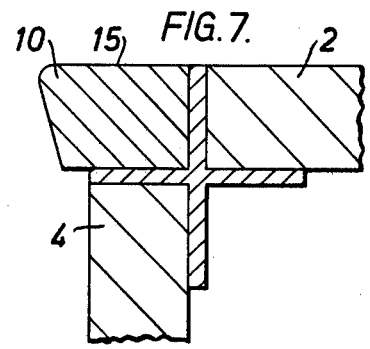
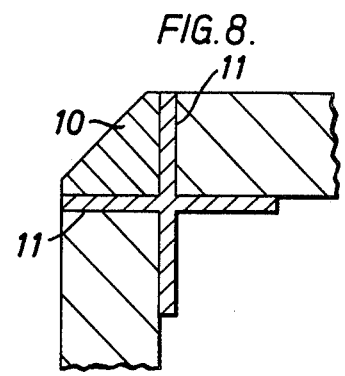
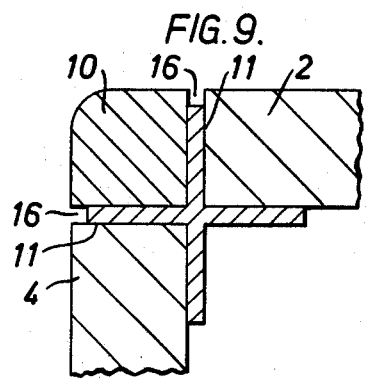
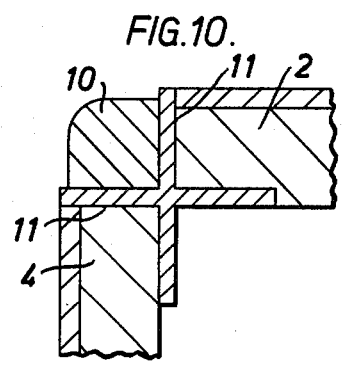
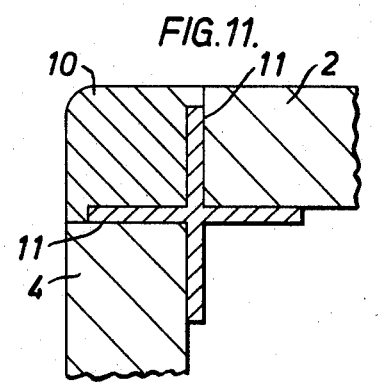
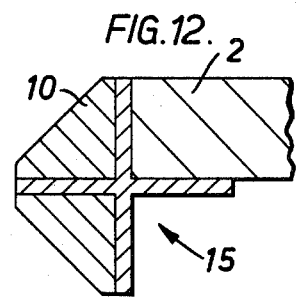

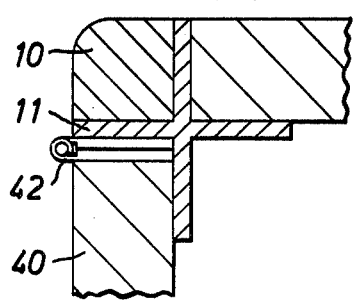
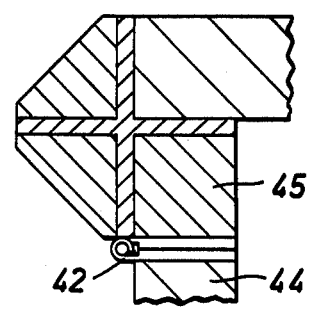
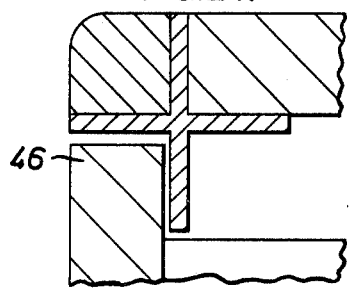
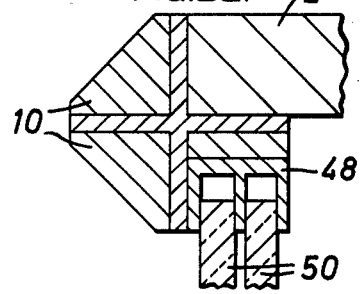
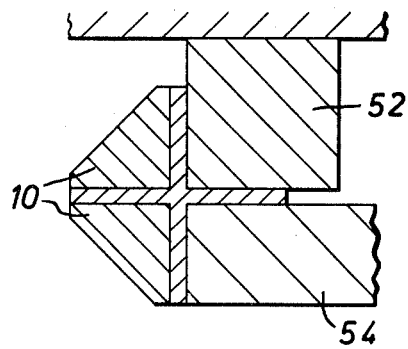

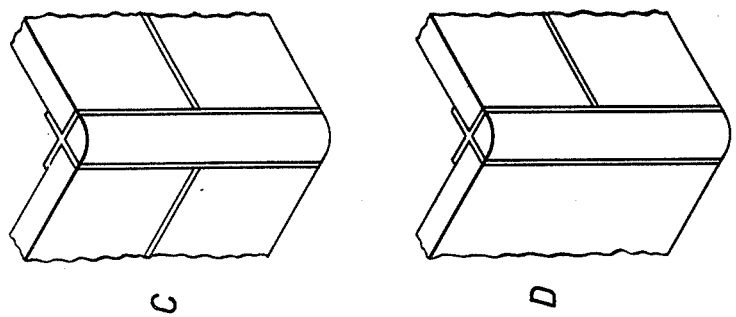
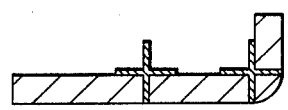
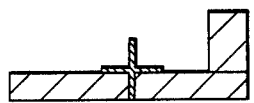
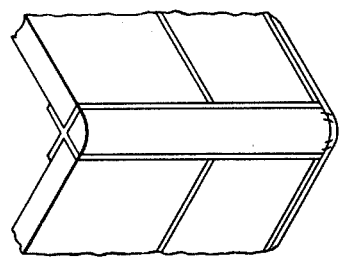
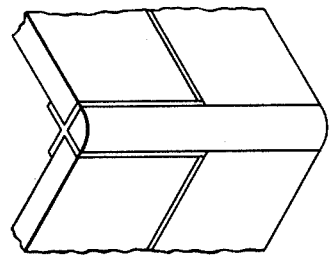
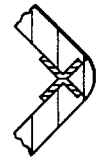
FIG.29.

FURNITURE OR THE LIKE

BACKGROUND OF THE INVENTION

This invention relates to structures comprising a plurality of components connected together and to the connection of such components to one another in a structure.

The invention is of particular, but not exclusive, applicability to structures in the form of articles of furniture, either movable articles of furniture, such as tables, desks etc. or furniture fixed permanently in a building, such as fitted cupboards or the like, and is especially, although again not exclusively, applicable to the connection in such structures of one panel to another, the term "panel" being used herein to include panels, boards, planks and the like components.

In building structures, such as articles of furniture, using panels of "man-made" sheet or board material, such as chipboard or fibreboard, it is often desired to make joints, particularly right-angled joints, between such panels.

Because of the manner in which "man-made" sheet or board material, such as chipboard, is formed, such a material may readily be produced with the major faces thereof having an appropriate finish or finishing layer in a panel cut from such sheet material, the faces, (hereinafter referred to as "edge-faces") formed by the cutting of the panel from the sheet, and extending transversely with respect to the major faces, from one major face to the other, cannot readily be provided with an acceptable finish, and are furthermore, without further treatment, susceptible to damage, so that it is common, for example, to cover such edge faces by a trim member or the like, where such faces would otherwise be exposed to view and/or damage. Furthermore, the structure of such sheet materials, such as chipboard, is such that it is difficult to form adequate and neat joints between panels of such materials by the methods conventional in the manufacture of wooden furniture, for example.

For these reasons, in structures where, for example, two such panels are to be joined at right angles to one another, particularly where the panels provide exposed outer surfaces of the structure, it is customary to connect the two panels indirectly, by connecting both to an intermediate connecting member, which may simply be a frame member of an internal frame, in which case an additional facing member will normally be required to cover the exposed edge face or faces of the or each panel, or may be a complex moulding which also performs the function of masking and protecting the edge face or faces which would otherwise be exposed at the junction between the panels.

It is among the objects of the invention to provide a method of connecting structural components, for example of furniture, the components being, for example, panels, which method is both simple and economical to effect, and is capable of providing a joint between such components which is both strong and of neat and pleasing appearance.

SUMMARY OF THE INVENTION

According to one aspect of the invention, there is provided a method of providing a joint between structural components each having a respective first face and a respective second face extending transversely to said first face, the method including the provision of a connecting member which affords a plurality of longitudinally extending webs also extending radially from a longitudinal axis of the connecting member and terminating in free longitudinally extending edges, the method further including securing said structural components to respective said webs with said first face of each said component engaged with a respective web face of the connecting member and said longitudinally extending free edge of the or each web so engaged facing in the same general direction as said second face of the respective component or components.

Thus where the components are panels having major finished faces, intended to be exposed to view, and forming said second face of the panels, and having cut edge faces, forming said first faces, the edge faces are covered and protected, while the parts of the connecting member exposed to view can be limited to free edge faces of said webs. If desired, by appropriate rebating or finishing techniques disclosed hereinafter, even this limited part of the connecting member can be readily concealed.

Alternatively, the free edge faces of the connecting member may be deliberately made apparent, for example, by being arranged to be in contrast with the finish of said second faces of the panels, and may, for example, be arranged to give the impression of an inlay.

The invention also comprehends within its scope a connecting member, for use in performing the above noted method, and affording a plurality of longitudinally extending webs also extending radially from a longitudinal axis of the connecting member and terminating in free longitudinally extending edges.

The invention also comprises a kit of parts, which may be assembled by the method of the invention to provide a structure, such as an article of furniture, the kit comprising at least two structural components each having a respective first face and a respective second face extending transversely to said first face, and at least one connecting member which affords a plurality of longitudinally extending webs also extending radially from a longitudinal axis of the connecting member.

According to a further aspect of the invention there is provided a method of providing a joint between structural components each having adjoining faces meeting in a longitudinally extended edge, the method comprising providing a connecting member which affords at least four webs extending radially from a longitudinal axis of the member, said webs also extending longitudinally, the arrangement being such that the connecting member defines a plurality of V-section longitudinal channels, each defined between a respective pair of said webs, the method comprising securing each of said components to be connected to the connecting member, with the portion of the component adjacent said longitudinally extended edge thereof engaged in the respective channel, and the faces of the component which meet at the respective longitudinally extending edge engaging the opposing faces of the respective said webs.

Preferably the connecting member is of cruciform cross-section, providing four such webs and four such V-section channels defined between said webs.

In the latter case two said structural components in the form of flat panels and extending at right angles to one another, towards a corner of the structure, may be engaged, at their adjoining edges, in respective channels of two diagonally opposite said V-shaped channels of the connecting member, disposed in said corner, the V-shaped channel on the outside of the angle between the two panels, and disposed between the two V-shaped channels which receive the panels, being occupied by a filling member.

The invention also includes within its scope a connecting member providing at least four webs extending radially from a longitudinal axis of the member, said webs also extending longitudinally, for example, a connecting member in the form of an extrusion of cruciform cross-section, and the invention further includes a kit of parts incorporating a connecting member, providing at least four webs extending radially from a longitudinal axis of the member, for example, a member of cruciform cross-section, and a plurality of connecting members, such as panels, having parts engageable in V-section channels defined between adjoining said webs of the connecting member.

The invention also includes within its scope a structure, such as an article of furniture made by either of the above noted methods according to the invention.

BRIEF DESCRIPTION OF THE DRAWINGS

Various other aspects and preferred and optional features will appear from the following description given by way of example, with reference to the accompanying drawings, in which:

FIGS. 2 to 11 are similar sectional views of various variant corner joints utilising cruciform section connecting members of the same form as that in the embodiment of FIG. 1;

FIGS. 12 and 13 are sectional views showing forms of edging arrangements for panels, which may be provided using a similar cruciform cross-section member;

FIGS. 15 to 23 are sectional views illustrating the utilisation of a similar connecting member in various other ways in the construction of furniture and the like;

FIGS. 29A to 29D illustrate details of the construction of the article of FIGS. 24 to 28, with alternative constructions.

DESCRIPTION OF THE PREFERRED EMBODIMENTS

The embodiments of the invention described below utilise connecting members cut from an extrusion which is of uniform cross-section throughout its length, the extrusion having a cruciform cross-sectional shape and thus affording four longitudinally extending webs, the webs extending radially from a longitudinal axis of the extrusion and being distributed at equal 90° angles about said axis. In the preferred form of the extrusion, the webs have equal radial extents and are terminated by respective outwardly directed edge faces.

Figure 1:
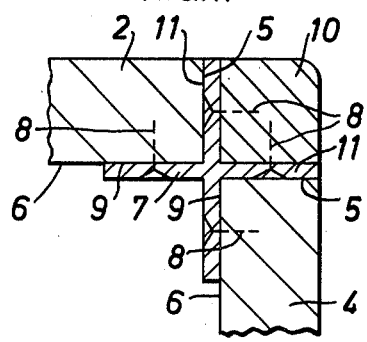
FIG. 1 is a sectional view illustrating the use of a connecting member of cruciform cross-section in the formation of a corner joint between two mutually perpendicular panels.

FIG. 1 illustrates the manner in which two generally planar panels, for example of chipboard, may be combined, with a section 7 of the extrusion referred to, in a corner joint in which the panels extend with their respective major faces at right angles to one another. The panels, indicated at 2 and 4 respectively, each terminate in a respective end face 5 extending between, and perpendicular to its major faces (i.e. the panels have square-cut edges). As shown in FIG. 1, each of the two panels 2,4, is engaged in a respective one of two diagonally opposite V-section channels defined between adjoining webs of the cruciform section connecting member 7, (four such channels being, of course, defined by the four webs of the cruciform section). Furthermore, as will be noted each of the panels 2, 4, is disposed with its major face 6 which is disposed on the inside of the angle between the panels lying snugly against the opposing surface of the respective web, (indicated at 9), of the cruciform section member 7 defining one of the walls of the respective V-section channel, and with its edge face 5 snugly engaged with the opposing face of the respective web (indicated at 11) which defines the other wall of the respective V-section channel, the corner edge of each panel formed at the junction of the respective edge face 5 with the respective major face 6 of the panel extending longitudinally along the vertex of the respective channel. Each panel 2, 4 is secured to the respective faces of the respective channel in which it is engaged, preferably using an adhesive only, although, if desired, screws may be extended into the panels via holes in the respective webs, such screws being indicated schematically at 8. The radial dimension of the webs of the cruciform section preferably corresponds to the thickness of the panels 2, 4, so that the exposed longitudinally extending edge faces of the webs 11 which extend across the edge faces 5 of the respective panels are flush with the major faces of the respective panels lying on the outside of the angle between the panels. The V-section channel which is disposed between the two channels receiving the panels 2, 4 and which is defined by the webs 11 which extend across the end faces 5 of the panels may be filled with a filling member 10 which in the arrangement shown in FIG. 1 simply comprises a strip of rectangular cross-section and of the same width as the webs 11 of the cruciform section, the member 10 extending longitudinally with the adjacent faces thereof engaging snugly with opposing faces of the two webs 11 so that the other two faces of the member 10, which define the exterior surface of the actual corner, lie flush with the outer faces of the respective panels 2, 4 and the corresponding outer edge faces of the respective webs 11. The member 10 may be secured in place either by adhesive or by screws.

It will be appreciated that, assuming that the corner construction shown at FIG. 1 is an external corner of a piece of furniture, the only portions of the cruciform section which will be exposed to view from the outside of the article of furniture will be the edge faces of the webs 11 of the section, which edges faces are relatively narrow and may, as will appear from what follows, be made unobtrusive, or concealed from view, or deliberately arranged to contrast visually with the adjoining surfaces of the panels 2, 4 and member 10, so as to present the appearance of an inlaid strip. At the same time, an easily constructed corner joint is afforded which possesses the requisite strength and furthermore protects the edge faces 5 of the panels 2, 4, which edge faces, if the panels are, for example, of chipboard, would otherwise be susceptible to damage.

Such cruciform section connecting members may be used to form all the main carcase joints in free-standing and fixed furniture or the like structures. The cruciform section extrusion may be made of plastics or metal, plastics being generally preferred on the grounds of cost, availability and ease of working.

The precise dimensions of the cruciform section used will depend, inter alia, on the thickness of the panels to be used, although, particularly where the extrusion is of plastics, the latter may easily be thinned to suit thinner panels by reducing the radial extent of one or more of the webs.

Figure 2:
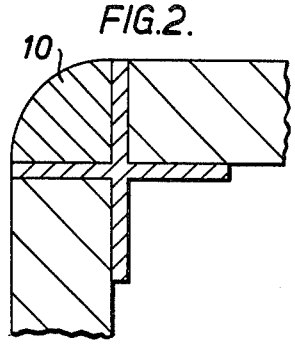
Figure 3:
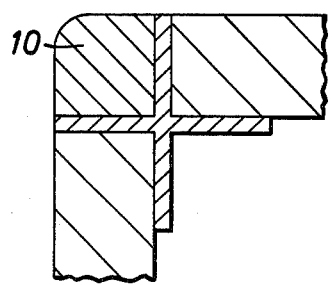
Figure 4:
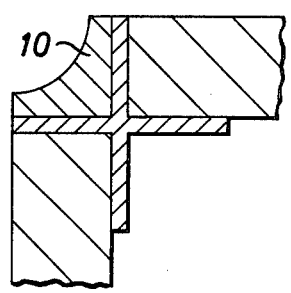

FIGS. 2, 3 and 4 are sectional views corresponding to FIG. 1 but illustrating the use of filling members 10 of various different cross-sectional shapes.

Figure 5:
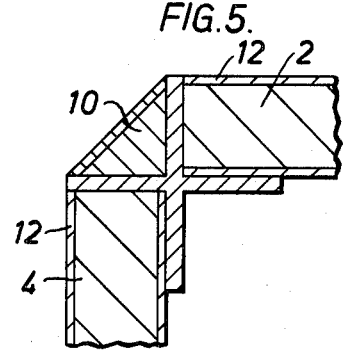

FIG. 5 is a view similar to FIGS. 1 to 4 but illustrating an arrangement in which the panels 2, 4 have their outer surfaces faced with a layer 12 of melamine sheet. In this arrangement, the filling member 10 may have, in cross-section, the form of a right angled triangle, with the exposed hypotenuse face also being covered with melamine sheet, the end faces of the outer webs 11 of the cruciform section being flush with the outer faces of the melamine sheets covering the panels 2, 4 and being exposed as before.

Figure 6:
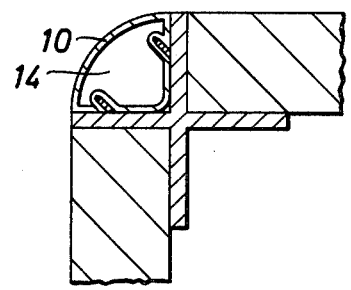

In the embodiment of FIG. 6, the filling member 10 is in the form of a member of sheet metal or plastics which span the space between the outer edges of the two webs 11 which extend across the edge faces of the respective panels, defining with the aforementioned webs an internal longitudinally extending space 14. In this case, the member 10 may be secured in place by adhesive or may be clipped into position, for example by being clipped on to an attachment strip previously secured to the respective webs 11 of the cruciform section.

In the arrangement of FIG. 7, the filling member 10, whilst having one outer face extending co-planar with the outer face of one panel 2 (for example, being the upper face of the panel 2 forming the flat horizontal top of an item of furniture), projects beyond the outer face of the other panel 4 (forming, for example, the vertical front of such an item of furniture) to a small extent, the exposed edge face of the web 11 which extends across the edge face of the panel 2 being flush with the upper surface of panel 2 and the surface 15, and the web 11 which extends across the edge face of the panel 4 terminating flush with the outer surface of the panel 4.

It will be appreciated that it is not necessary that the edge faces of the respective webs 11 should be flush with the respective outer surfaces of the panels which meet in the corner joint. Thus, if desired, the radial dimensions of the respective webs of cruciform section may be somewhat less than the thickness of the panels 2, 4, as in the arrangement shown in FIG. 9 in which the outer surfaces of the filling member 10, in the regions adjoining the respective webs 11 of the cruciform section, are substantially co-planar with the outer surfaces of the respective panels 2, 4, so that the outer edge faces of the webs 11 which extend between the panels 2, 4 and the member 10 form the bottoms of shallow grooves 16 on the exterior of the article of furniture, which grooves may, if desired, be suitably filled, for example with a decorative insert or with a filling material presenting the same general appearance as the exposed outer faces of the panels 2, 4 and/or the filling member 10.

It is possible, alternatively, to arrange that the webs 11 of the cruciform section connecting member which extend across the edge faces of the panels 2, 4 project beyond the outer surfaces of these panels to an extent corresponding to the thickness of a finishing layer applied to these panels, such finishing layer being, for example, glass, tiles, leather, fabric, metal etc. In this case, the filling member 10 may once again be formed with its outer surface or surfaces being substantially a continuation of the surfaces of panels 2, 4 to which the finishing layer is applied, thereby defining a recessed region over the filling member 10, in which a similar, or if preferred a contrasting, layer may be applied to provide an outer surface flush with the exposed edges of the webs 11 and the adjoining finishing layers extending over the panels 2, 4. Such an arrangement is illustrated at FIG. 10.

In the arrangement shown in FIG. 11, the two outer webs 11 of the cruciform section member have their longitudinally extending outer edge faces set back with respect to the outer surfaces of the adjoining panels 2, 4 as in the embodiment of FIG. 9, but in this case the filling member 10, which again has its outer surfaces flush with the outer surfaces of panels 2, 4, extends over the edge faces of the respective webs 11 of the cruciform section to engage the adjoining edge faces of the panels 2, 4, the two outer webs 11 of the cruciform section member being, in effect, received in respective rebates formed in the filling member 10. One or both of the two inner webs of the cruciform section, i.e. the webs which extend on the inside of the corner joint generally parallel with the major faces of the adjoining panels, may be accommodated in respective rebates formed in the inner faces of the respective panels, for example, as indicated in FIG. 10.

FIG. 8 illustrates a corner joint similar to that shown at FIGS. 1 to 6 but in which the filling member 10 is in the form of an elongate strip having five flat faces, the strip being of the cross-sectional shape shown, and corresponding substantially to the major one of two parts of a square divided by a straight line parallel with, but off-set slightly from, one diagonal. In the corner joint at FIG. 8, the two major perpendicular faces of the filling strip 10 are in engagement with and coextensive with the opposing faces of the respective outer webs 11 of the cruciform section connecting member.

FIG. 12 shows the manner in which two filling strips of the form shown at FIG. 10 may be combined with a corresponding cruciform section connecting member to form a trim for the free edge of a panel 2 forming the top or side of an article of furniture, the free edge of the respective web of the cruciform section member being again flush with the outer surface of the panel 2 and adjoining narrow face of the adjoining filling member 10. In the arrangement shown in FIG. 12, the V-shaped channel 15 of the cruciform section which would not normally be visible has been left unfilled. However, if desired, and as illustrated at FIG. 13, this remaining V-shaped channel may also be filled with a similar filling strip 10.

Figure 13:
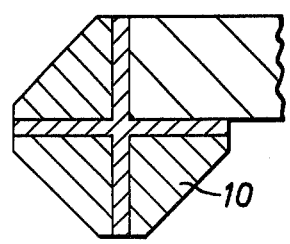
Figure 14:
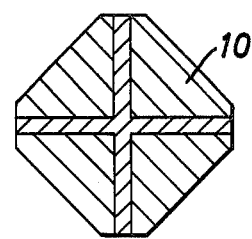
FIG. 14 is a cross-sectional view of a leg of an item of furniture incorporating a similar cruciform cross-section member.

As shown in FIG. 14, four filling strips 10 of the form shown in FIGS. 8 to 13 may be combined with a corresponding cruciform section connecting member to form a spar or leg of an article of furniture, the filling members being engaged in respect of V-shaped channels provided by the cruciform section member in the manner shown, so that the overall peripheral cross-sectional shape of the leg or spar is that of an octagon.

Figure 16:
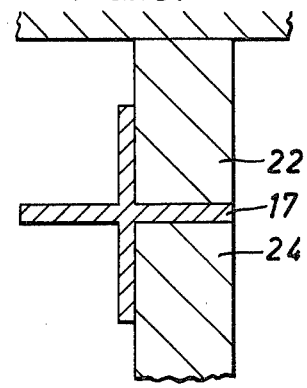

As will already be apparent from FIGS. 12 to 14, the cruciform section member is not confined, in its usefulness, to the provision of corner joints between panels and thus, for example, as shown in FIG. 16, a length of the cruciform section extrusion may have one web 17 thereof engaged between opposing edge faces of substantially co-planar panels 22 and 24, to provide a wall fixing, the adjoining webs of the section engaging the major faces of the panels 22 and 24 which are remote from the exposed edge face of the web 17 which is disposed between the panels.

Figure 17:
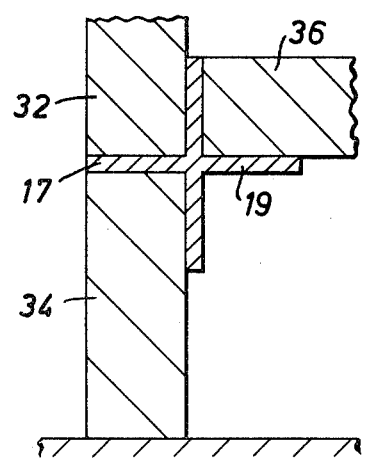

In a similar arrangement illustrated at FIG. 17, one web 17 of the cruciform section member is engaged between opposing edge faces of a panel 32, providing the outer wall of an article of furniture, and a panel 34, forming part of a base or plinth of the article of furniture, the outer faces of the panels 32 and 34 being, as before, flush with one another and with the exposed edge face of the adjoining web 17 of the channel section. In this arrangement, the web 19 of the section which is directly opposite to and coplanar with the web 17 which is engaged between the panels 32 and 34 provides a support for a panel 36, forming, for example, the bottom of the interior of the article of furniture, panel 36 being snugly engaged in the V-shaped channel, defined between the web 19 on which it rests and the upper vertically extending web of the channel section member, in the same way as the other panels are engaged in their respective V-shaped channels.

Figure 18:
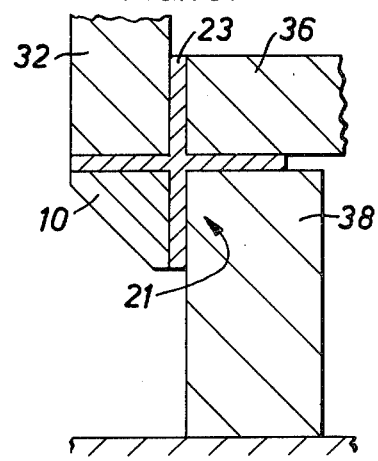

In a variant arrangement shown at FIG. 18, a rectangular section member 38 forming part of a recessed plinth is engaged in the V-shaped channel 21 of the cruciform section, which channel is disposed directly below the respective channel in which the panel 36 is engaged, the panel 32 forming the outer wall of the article of furniture being, as before, snugly engaged in the V-shaped channel which lies on the opposite side of the upwardly extending vertical web 23 from the panel 36, the remaining V-shaped channel being occupied by a filling member 10 of the same form as used in the embodiments of FIGS. 8 and 12 to 14.

Figure 15:
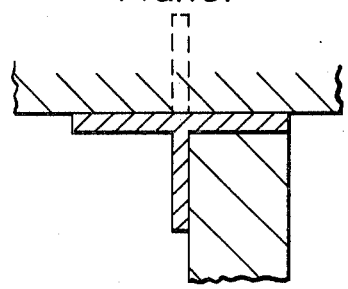

In certain instances a useful connecting member may be formed by modifying the basic cruciform section, for example, by reducing or removing one web. FIG. 15 illustrates an arrangement in which a connecting member, originally of cruciform section, has one of its four webs trimmed off, leaving a T-section member, to afford a wall fixing.

FIG. 19 illustrates how a hinged joint may be provided in the region of a corner of an article of furniture between a door panel 40 and the adjoining part of the remainder of the article of furniture, which may, for example, be a cupboard. The arrangement of FIG. 19 is similar in construction and outward appearance to the corner joint of FIG. 3 and differs therefrom merely in that the door panel 40 is connected with the web 11 of the cruciform section which lies between the edge face of the door 40 and the filling member 10 via butt hinges 42 interposed between the edge face of the door panel 40 and the opposing face of the respective web 11 of the cruciform section, the butt hinges being secured in the traditional fashion by screws.

The arrangement of FIG. 20 corresponds to the arrangement of FIG. 12 with the addition of a door arrangement comprising a door panel 44 secured by butt hinges 42 to an adjoining square section member 45 which is secured, for example, by screws, in the V-shaped channel which is open in FIG. 12. In both FIGS. 19 and 20 the knuckles of the hinges are disposed adjacent the outer faces of the door panels so that the latter open outwardly.

FIG. 21 illustrates, in vertical section, part of an article of furniture in which the transition between the flat top of the article and an adjoining vertical front of a drawer fitted in the article is contrived using a cruciform section member, the arrangement being similar to that of FIG. 3 except that the panel 46, forming the drawer front, is not secured in its respective V-shaped channel but fits freely in the same when the drawer is closed.

FIG. 22 is again a view in vertical section of part of a cupboard or the like, the arrangement corresponding to that of FIG. 12, with the panel 2 forming the flat top of the cupboard or the like and the filling members 10 being secured in the respective V-shaped channels of the cruciform section connecting member, the remaining V-shaped channel having fitted therein a guide strip 48 affording, in known manner, two longitudinal channels to receive edges of respective sliding glass doors 50.

FIG. 23 is a sectional view illustrating a headboard construction comprising a cruciform section member, two filling strips 10 of the form shown in FIG. 10, a rectangular section member 52 and a panel 54 engaged in respective V-shaped channels of the cruciform section connecting member.

FIGS. 24 to 29 illustrate the construction of a generally rectangular coffee table which comprises various panels and boards but in which the various corner joints between the various panels and boards are effected using cruciform-section connecting members 7 in the manner described hereinbefore.

Whilst the features of the construction of the coffee table will be evident from the drawings, it will be noted that the table comprises basically a top 70, a horizontal lower deck 72, a plinth 74 comprising four boards connected in the form of a rectangle, the plinth 74 supporting the deck 72 and, via side walls 76 and 78, the top 70. These side walls 76, 78 each comprise two parallel superimposed pieces of board, each of the four pieces of cruciform section extrusion bounding the edges of each said side wall having a respective web engaged between the two boards forming the side wall, the plinth boards being connected with the deck 72 and with the outer boards of the side wall 78 in the manner illustrated at FIG. 17 and the connections between the plinth boards, between the side walls 76, 78 and the top 70 and between the plinth and internal surrounds 80 (FIG. 28), being constructed substantially as described with reference to FIG. 2, with the exposed V-shaped channels of the respective cruciform section connecting members being occupied by filling members 10 of the crosssectional form shown at FIG. 2.

Figure 24:
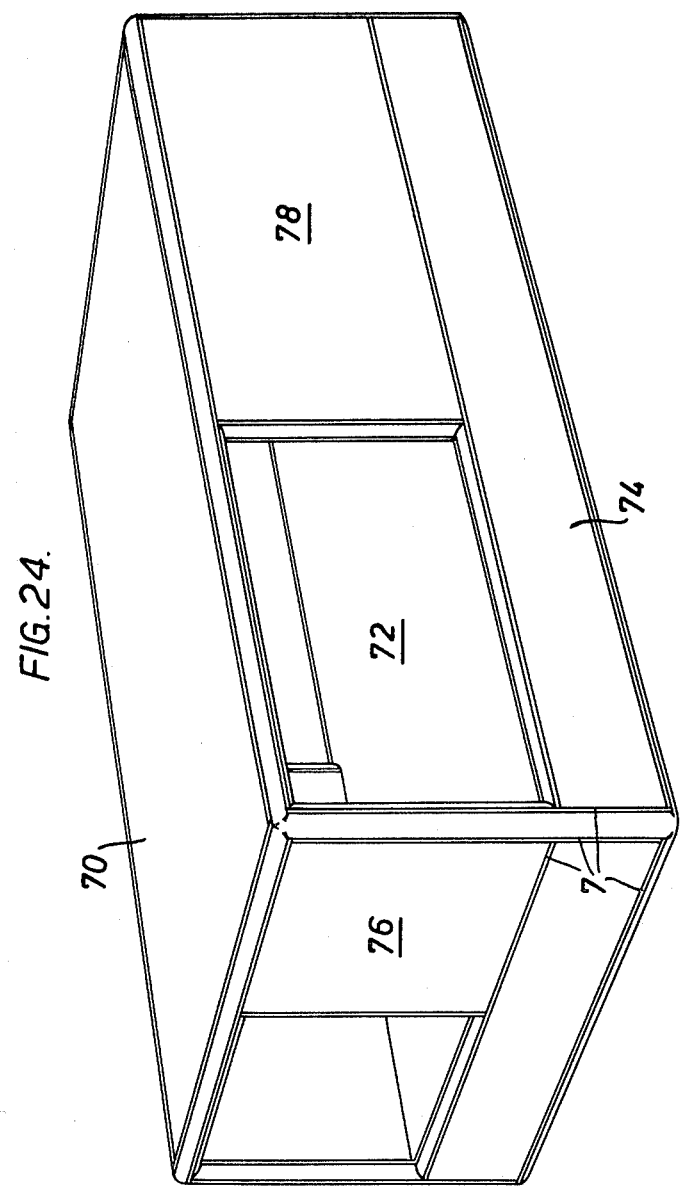
FIGS. 24 to 28 are various views showing an item of furniture incorporating cruciform-section connecting members.
Figure 25:
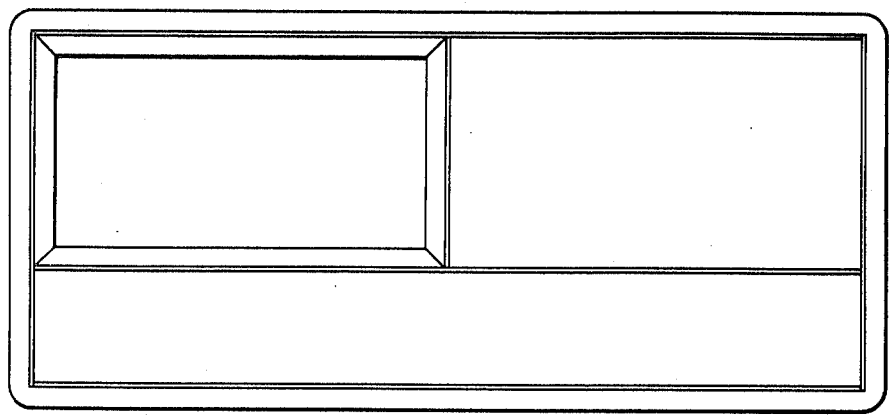
Figure 26:
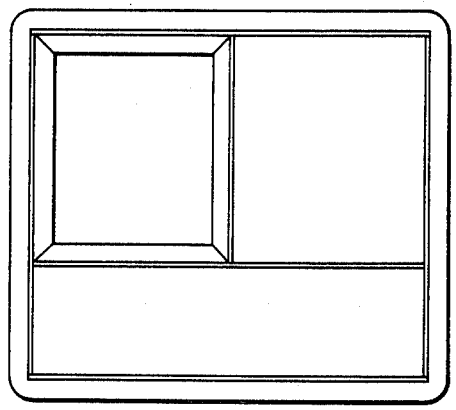
Figure 27:
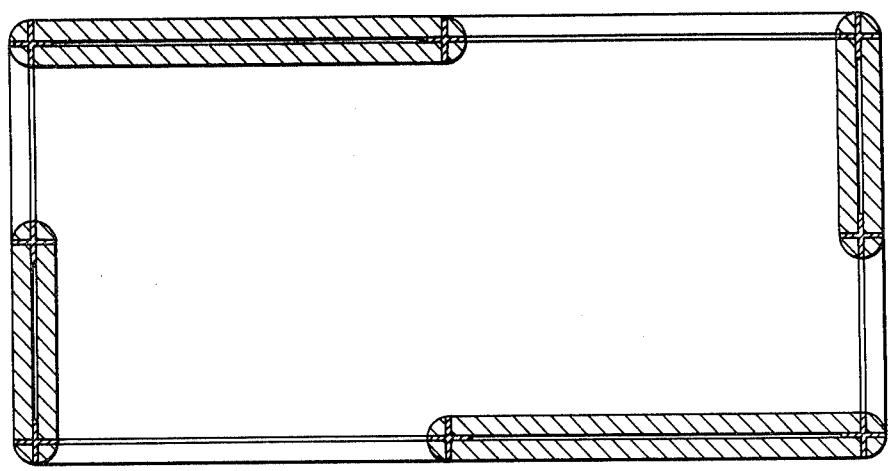
Figure 28:
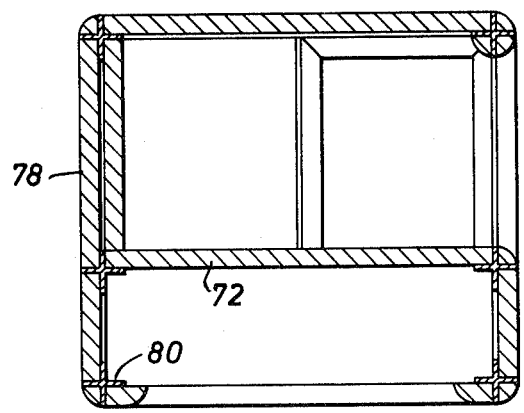

As shown in FIG. 24 the exposed edge faces of the webs of the cruciform section connecting members present the appearance of decorative inlays fitted during finishing of the article of furniture rather than part of the basic structure of the latter, i.e. present the appearance of being entirely part-formed.

As already noted, particularly if the cruciform section extrusion is of plastics material, the latter may be worked and finished as desired relatively easily, for example, to accommodate variations in the thickness of the panels or boards.

The flanks of the webs of the cruciform-section connecting members, i.e. the surfaces which engage and are adhesively secured to the adjoining surfaces of the panels, filling members or the like are preferably roughened, or provided with an irregular or matt finish, so as to promote good adhesive bonding with the adjoining panels or the like. By contrast, the free edge faces of the webs of the cruciform section members which, as noted, may be exposed to view in many embodiments, preferably have a polished or glass finish.

It will be appreciated from the above that the use of connecting members of cruciform section, produced by extrusion, in the formation of corner joints and the like in structures such as articles of furniture eliminates much of the difficulty involved in the production of effective corner joints and the like. As the production of adequate joints between components which are also acceptable in appearance is precisely the thing which affords most difficulty to amateur furniture makers who are unskilled or limited in the tools they possess, the techniques described with reference to the drawings are of particular usefulness in "do-it-yourself" applications.

I claim:

1. A structure having a plurality of structural components connected together, comprising:

first and second planar panels each having opposite inner and outer parallel major faces and an edge face extending perpendicular to said major faces from one of said major faces to the other;

a unitary cruciform-shaped connecting member having throughout its length a uniform cross-section, said connection member having a longitudinal axis and four longitudinally extending webs extending radially from said longitudinal axis at intervals of 90° around said axis, said webs terminating in free longitudinally extending edges, each of said panels being positioned within a respective diagonally opposite angle of said cruciform-shaped connecting member with an inner major face secured to one of said webs and an edge secured to another of said webs, said first and second panels being mutually perpendicular to one another; and a filling member positioned within the angle of said cruciform-shaped connecting member which is between the angles receiving said first and second panels, the outer major face of each of said panels being exposed up to the edge of the web to which its edge face is secured.

2. A structure according to claim 1 wherein the connecting member is entirely concealed from view from the exterior of the structure.

3. A structure according to claim 1 wherein the free edge faces of the connecting member are deliberately made apparent by being arranged to be in contrast with the finish of said second faces of said first and second structural components.

* * * * *